United States Patent [19]

Mandrin

[11] Patent Number: 4,504,460

[45] Date of Patent: Mar. 12, 1985

[54] METHOD AND PLANT FOR OBTAINING DEUTERIUM-ENRICHED WATER

[75] Inventor: Charles Mandrin, Winterthur, Switzerland

[73] Assignee: Sulzer Brothers Limited, Winterthur, Switzerland

[21] Appl. No.: 402,226

[22] Filed: Jul. 27, 1982

[30] Foreign Application Priority Data

Jul. 30, 1981 [CH] Switzerland ................ 4929/81

[51] Int. Cl.³ ........................................... C01B 5/00
[52] U.S. Cl. .................................... 423/580; 422/159; 422/187; 422/189; 423/648 A
[58] Field of Search ............ 423/580 H, 648 A, 580; 422/159, 187, 189

[56] References Cited

U.S. PATENT DOCUMENTS 4,123,508  10/1978  Mandrin ..................... 422/159
4,213,953   7/1980  Mandrin ..................... 423/648 A

FOREIGN PATENT DOCUMENTS 47357  9/1980  European Pat. Off. ........ 423/648 A

*Primary Examiner*—John Doll
*Assistant Examiner*—Wayne A. Langel
*Attorney, Agent, or Firm*—Kenyon & Kenyon

[57] ABSTRACT

The synthesis gas plant is operated in n successive periods. During the first period, fresh water in excess is supplied to the synthesis gas plant (1) and the waste water from the resulting mixture is separated in a condenser (8) and supplied to a storage container (25). During the next (n−1) operating periods the waste water stored in the container (25) is used as freed water for the synthesis gas plant (1) and the waste water obtained on each occasion is stored in layers, depending on its deuterium concentration, in the container (25). The waste water having the highest deuterium concentration, obtained during the last operating period, is introduced into a second container (24) and supplied therefrom to a heavy-water plant.

In order to recover deuterium from the gas mixture leaving the condenser (8) and consisting of hydrogen, steam and residual components, the gas mixture is introduced into an exchange stage (38), in which the gas mixture is brought into isotope exchange in countercurrent with additional water, as a result of which the additional water becomes enriched in deuterium and is supplied to the synthesis gas plant.

8 Claims, 3 Drawing Figures

METHOD AND PLANT FOR OBTAINING DEUTERIUM-ENRICHED WATER

This invention relates to a method and plant for obtaining deuterium-enriched water.

Heretofore, various techniques have been employed for obtaining deuterium-enriched water which can be used as a starting product in a heavy water plant.

For example, U.S. Pat. No. 4,426,370 describes a method wherein hydrogen is obtained in a synthesis gas plant and deuterium-enriched water is obtained as a starting product for a heavy water plant. As is known, the synthesis gas plant is operated in a number of successive periods as follows.

During a first period, fresh water in excess is introduced into the synthesis gas plant and the waste water from the resulting mixture is separated in a condenser and introduced into a storage container. During the subsequent operating periods, the waste water stored in the container is used as feed water for the synthesis gas plant and the waste water obtained on each occasion is stored in layers, depending on its deuterium concentration in the container.

The waste water obtained during the last operating period and having the highest deuterium concentration is introduced into a second container and supplied therefrom to a heavy-water plant.

Other techniques are also known, such as described in Swiss Pat. No. 616 602 and U.S. Pat. No. 4,123,508 wherein deuterium-enriched water is obtained in the production of hydrogen. In this case the deuterium-enriched water is for use as the starting product for a heavy-water plant in combination with a plant for catalytic production of hydrogen. As described, in one embodiment methane is decomposed in the presence of deuterium-enriched steam into hydrogen, nitrogen and carbon dioxide in a synthesis gas plant. Deuterium-enriched water is separated from the gas mixture in a condenser and part of the enriched water is used to enrich steam with deuterium in an exchange column.

The rest of the gas mixture is introduced into at least one exchange stage comprising a catalytic separating stage for isotope exchange between hydrogen and steam and an exchange column for isotope exchange between steam and a stream of water taken from an additional source. The resulting deuterium-enriched water is likewise used for deuterium enrichment of steam introduced into the plant, whereas the mixture of hydrogen and nitrogen taken from the exchange stage is supplied to an ammonia synthesis plant.

However, the maximum deuterium concentration of the enriched water used to supply a heavy-water plant is limited, in this case, by mass flow conditions and the separating factors of the hydrogen production process. It cannot be shifted to improve the economics of heavy-water production. This particularly applies to the quantitative relation between the streams of hydrocarbons and steam supplied to the synthesis gas plant and the mixture of hydrogen, steam and residual components which are withdrawn and the waste water which condenses out. In addition, the temperatures in the synthesis gas plant determine the deuterium separation factor between hydrogen and water.

As shown by the numerical example given in Swiss Pat. No. 616 602, the water fed to the heavy-water plant can be given a deuterium concentration of 333 ppm (D/D+H) at a throughput of 1,000 kmol/h.

Assuming that the deuterium recovery yield from the water fed into the heavy-water plant is 0.75, the resulting heavy-water production is 4.995 kg/h heavy water and the a factor is $2.775 \cdot 10^{-4}$ Kg $D_2O/H_2O$. The factor a is an economy factor defined as the ratio of specific heavy-water production to feed water flow.

A feed water throughput of 1 k mol/h with a natural deuterium concentration of 146 ppm (D/D+H), e.g. river water, gives an a factor of $1.217 \cdot 10^{-4}$ kg $D_2O/H_2O$. As is known, the a factor is inversely proportional to the size of the heavy-water plant and the energy consumption thereof.

According to the numerical example given in the cited Swiss Patent, the theoretical heavy-water production based on the equivalent heavy-water throughputs available in the streams of feed water, is 28.33 Kg $D_2O$/Kg $H_2O$. In practice, however, as previously stated, the production is only 4.995 kg/h $D_2O$ and the said yield is therefore about 17.7%.

The initially-mentioned process described in U.S. Pat. No. 4,426,370 has an economic limitation in that the said yield from the available deuterium sources is relatively low. In other words, this means that relatively little heavy water can be obtained from a synthesis gas plant of given size. In the numerical example given on page 15 of the cited Swiss Patent Application, the production after three operating periods is 2.129 kg/h $D_2O$. As can be seen, this yield is smaller under comparable conditions in a process according to Swiss Pat. No. 616 602, in which the production is 4.995 kg/h $D_2O$. The corresponding yield is only 10%.

The a factor is only $2.42 \cdot 10^{-4}$ kg $D_2O/H_2O$. However, the a factor can be increased by increasing the number of operating periods. However, in that case, the yield will drop still further. The relatively poor yield is because the ammonia synthesis gas ($N_2+3H_2$) leaving the plant still has a relatively high deuterium concentration, mainly during the last operating period, and no devices are provided for recovering this deuterium for the heavy-water plant.

Accordingly, it is an object of the invention to obtain a relatively high economy in obtaining heavy water.

It is another object of the invention to obtain a relatively high a factor in obtaining heavy water from feed water.

It is another object of the invention to obtain a high yield of deuterium-enriched water while simultaneously obtaining a high a factor in a heavy-water production process.

Briefly, the invention provides a method and plant for obtaining deuterium-enriched water.

The method comprises the steps of supplying a synthesis gas plant over (n) successive operating periods with at least one hydrocarbon and an excess of water or steam in order to obtain a mixture of hydrogen, steam, carbon dioxide and nitrogen. In addition, the mixture is separated into a deuterium-enriched condensate which consists of waste water as well as a gas fraction which contains hydrogen, steam and residual components.

In accordance with the invention, the condensate is stored in a container in layers corresponding to the deuterium concentration.

During operation, fresh water in excess is supplied to the synthesis gas plant during an initial operating period of the (n) operating periods. During subsequent operating periods, except for the last operating period, waste water is supplied from the poorest deuterium-containing layer in the container. During the last operating period, the waste water in the container is supplied to a second container for subsequent supply to a plant for obtaining heavy water.

In further accordance with the invention, the gas fraction is delivered to at least one exchange stage. While in the exchange stage, the hydrogen of the gas fraction is brought into isotopic exchange with additional water having a natural deuterium concentration so as to deplete the gas fraction of deuterium while enriching the original water with deuterium. Thereafter, the deuterium enriched water is stored for supply to the synthesis gas plant during (n−1) operating periods.

In one embodiment, the hydrogen of the gas fraction in the exchange stage is first brought into isotope exchange with steam in order to enrich the steam with deuterium while depleting the hydrogen of deuterium. Thereafter, the enriched steam is brought into isotope exchange in counter-current with the additional water in order to enrich the water with deuterium while depleting the steam of deuterium.

In another embodiment, the entire gas fraction is brought into isotope exchange in counter-current with the additional water in which sodium hydroxide or potassium hydroxide is dissolved. Again, the gas mixture is depleted of deuterium while the additional water is enriched in deuterium.

In still another embodiment, the deuterium-enriched water from the exchange stage is mixed with the waste water in the first container for supply to the synthesis gas plant. Alternatively, the water may be stored in a third container and may be supplied to the synthesis gas plant in alternating manner with the waste water from the first container during successive (n−1) operating periods. In these cases, it does not matter whether waste water is supplied to the synthesis gas plant before the deuterium enriched water or vice versa.

The plant for producing the deuterium-enriched water comprises a synthesis gas plant, a condenser, two containers, means for selectively supplying fresh water to the synthesis gas plant, at least one exchange stage and means for storing enriched additional water from the exchange stage.

The synthesis gas plant is constructed so as to produce a mixture of hydrogen, steam, carbon dioxide and nitrogen from water and at least one of hydrocarbon.

The condenser is constructed to separate the mixture from the synthesis gas plant into a deuterium-enriched condensate consisting of waste water and a gas fraction containing hydrogen, steam and residual components.

One container is connected with the condenser to selectively receive successive charges of the condensate in layers from the separator. In addition, the container is connected at a lower end with the synthesis gas plant in order to selectively supply waste water to the synthesis gas plant.

The means for supplying fresh water to the synthesis gas plant is selectively operated during an initial operating period only.

The second container is connected with the condenser to selectively receive condensate from the separator in the last operating stage for subsequent supply to the heavy water plant.

The exchange stage is connected with the condenser for receiving and placing the gas fraction from the condenser in isotope exchange with additional water having a natural deuterium concentration in order to deplete the gas fraction of deuterium while enriching the additional water with deuterium.

The means for storing the enriched additional water may constitute a third container which is connected between the exchange stage and the synthesis gas plant.

In addition, a condenser is connected to the exchange stage to receive a flow of hydrogen, steam and nitrogen from the exchange stage. Also, the condenser has an outlet for supplying the received hydrogen and nitrogen to an ammonia synthesis plant.

These and other objects and advantages of the invention will become more apparent from the following detailed description taken in conjunction with the accompanying drawings wherein.

As described below, the purpose of each embodiment is not only to produce deuterium-enriched water but also to produce a synthesis gas mixture consisting of hydrogen and nitrogen for use in obtaining ammonia in an ammonia synthesis plant (not shown). However, the hydrogen which is obtained may also be used for obtaining methanol.

Figure 1:
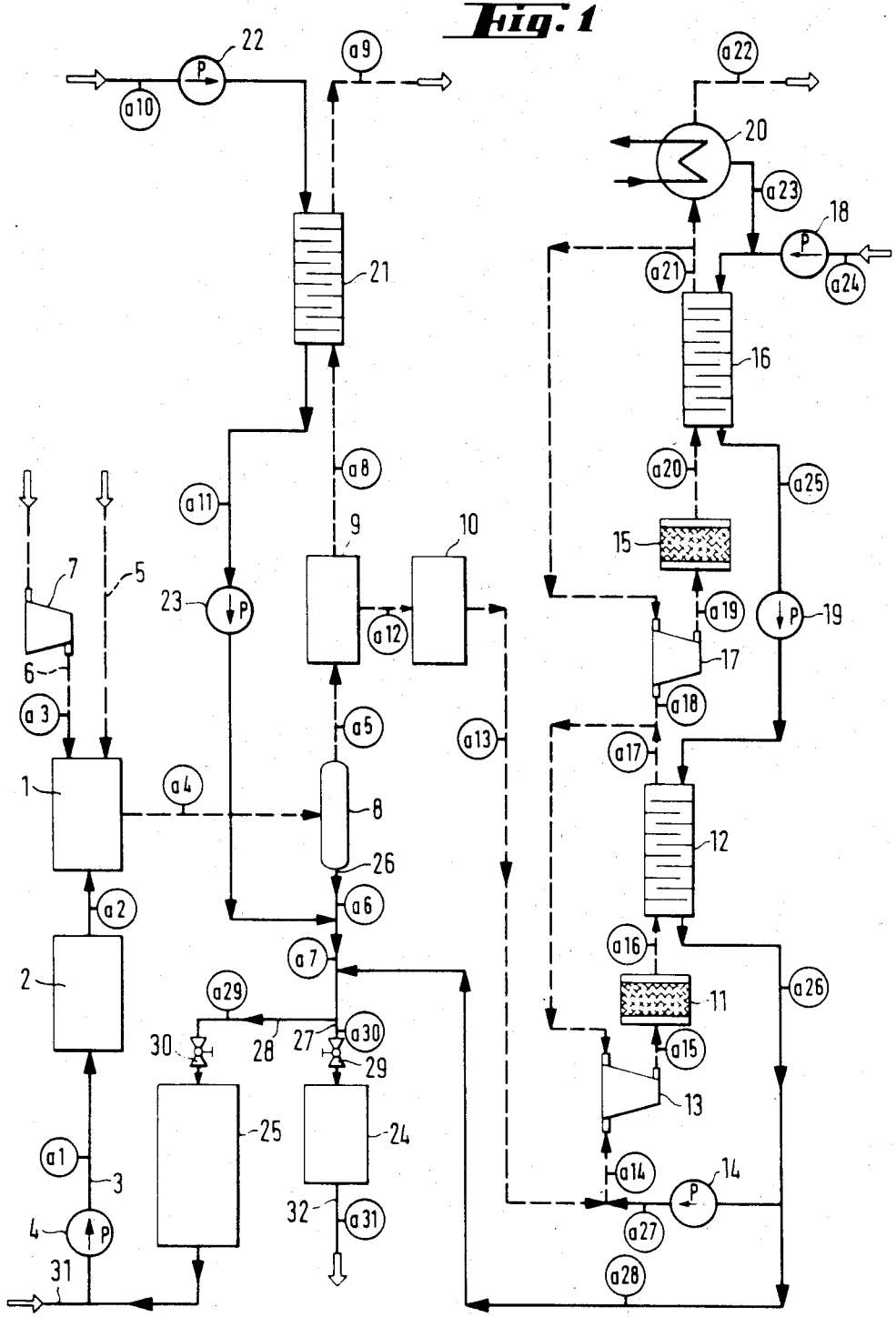
FIG. 1 illustrates a flow diagram of a thermal synthesis gas plant for obtaining hydrogen coupled to a system for obtaining deuterium-enriched water in accordance with the invention.

Referring to FIG. 1, a catalytic synthesis gas plant 1 for producing hydrogen or steam and nitrogen is conventional and known and therefore shown only diagrammatically. The plant substantially comprises a primary reformer containing a catalyst, e.g. nickel oxide, which is supplied with heated high-pressure steam and a hydrocarbon, e.g. methane, a "secondary reformer" into which air is supplied, and a converter in which a chemical reaction occurs as represented by the equation $CO + H_2O \rightarrow CO_2 + H_2$ (compare German PS No. 22 11 105).

In this embodiment, high-pressure steam at e.g. about 40 bars is produced in a steam generator 2 supplied by a line 3 and pump 4 with fresh water during an initial operating period of (n) operating periods and with enriched waste water from a storage container 25 during the next (n−1) operating periods. The high pressure steam is fed into the primary reformer of the synthesis gas plant 1. In addition, a hydrocarbon, e.g. methane, brought to the operating pressure of the plant 1 in a compressor 7, is supplied through a line 6, together with compressed air through a line 5.

The mixture leaving the plant 1 mainly comprises hydrogen, steam, carbon dioxide and residual componed and is delivered to a condensor 8 in which deuterium-enriched water is separated from the mixture.

The separated gas fraction or the mixture, mainly containing hydrogen, residual componed, carbon dioxide and traces of steam, is supplied to a carbon-dioxide separator 9 of known construction (see e.g. Chemical Engineering Progress (Vol. 70/No. 2), February 1974, page 57; FIG. 4). The gas mixture is then supplied to a conventional methanator 10 in which chemical reactions occur as represented by the equations $CO + 3H_2 \rightarrow CH_4 + H_2O$ and $CO_2 + 4H_2 \rightarrow CH_4 + 2H_2O$.

The resulting mixture, consisting mainly of hydrogen, steam and traces of methane, in which the hydrogen and steam have been enriched with deuterium above the natural concentration, is passed from the methanator 10 and is introduced into a first exchange stage. The exchange stage substantially comprises a separating stage 11 containing a catalyst e.g. platinum or nickel catalyst, an exchange column 12 and a compressor 13.

As indicated, the stream of mixture leaving the methanator 10, to which part of a stream of deuterium-enriched water from the exchange column 12 has been added by a pump 14, is compressed in the compressor 13 and delivered to the separating stage 11. The stream of water evaporates using sensitive heat from the stream of gas mixture. Depending on the dimensions of the total process, it may also be necessary to additionally cool the mixed stream or heat it by an external source.

While in the separating stage 11, an isotope exchange occurs between the hydrogen and steam. As a result, the steam becomes enriched in deuterium while the hydrogen is depleted of deuterium.

Of note, part of the gas or steam mixture leaving the exchange column 12 is also introduced by the compressor 13 into the separating stage 11. The purpose of this recirculation is to insure that a sufficient quantity of steam is brought into contact with hydrogen into the separating stage 11, resulting in an optimum deuterium-enrichment of the steam.

In the case of conventional catalysts, such as platinum or nickel, the mixture entering the separating stage 11 must be heated until the steam is superheated, to prevent water droplets from corroding and deactivating the catalyst.

The mixture can be heated e.g. by using the heat of compression from compressor 13. If this heat is insufficient, an external source is used for heating the mixture.

In exchange column 12, an isotope exchange occurs between the steam and the mixture leaving the separating stage 11 and a counter-current of water coming from an additional source. As a result, the water becomes enriched with deuterium and the steam is depleted in deuterium. The hydrogen from the mixture does not take part in the isotope exchange in this column 12.

In the example, a second exchange stage comprising a separating stage 15, an exchange column 16 and a compressor 17 is disposed in series with the first exchange stage in the system. The exchange processes in stage 15 and column 16 occur in the same manner as in the first exchange stage. Depending on the process control, it may be advantageous to dispose a larger number of such exchange stages in series in the system.

As indicated, water from an additional source (not shown) and having a natural deuterium concentration is brought by a pump 18 to the pressure required by the synthesis gas plant and introduced into the exchange column 16. This water is then enriched in deuterium and then conveyed by a pump 19 to the exchange column 12 of the first exchange stage. After the steam from the mixture leaving column 16, which comprises deuterium-depleted hydrogen, nitrogen, steam and traces of methane, has been liquefied in a condenser 20, the steam being likewise depleted in deuterium, and has been returned to the exchange column 16, the synthesis gas mixture is introduced into an ammonia synthesis plant (not shown).

In addition, water coming from another source, after being brought in an exchange column 21 in isotope exchange with deuterium-enriched steam from the carbon dioxide separator 9, becomes enriched with deuterium and is mixed with the waste water taken from the condenser 8. Pumps 22 and 23 are disposed in the line conveying water from the additional source and are used to bring the water to the pressure required by the synthesis gas plant 1 in exchange column 21, and also compensate pressure losses in the lines.

The steam from the exchange column 21, after being depleted in deuterium, is discharged from the plant together with carbon dioxide. Similarly, the water enriched with deuterium in exchange columns 16 and 12 is mixed with the waste water taken from condenser 8.

The condenser 8 is connected to a line 26 for withdrawing waste water and the two aforementioned partial streams coming from the additional water sources and enriched with deuterium. This line 26 branches into two lines 27, 28 which are respectively connected to containers or stores 24, 25 and contain shut-off means i.e. valves 29, 30.

The places a1 to a28 marked in the flow diagram correspond to the similarly-marked places in the embodiment of Swiss Pat. No. 616 602, where the temperature, pressures, throughputs, deuterium concentrations and separating factors are given in a numerical example.

In the present case, a29 to a31 denote points in the process for storing enriched water. The operation of the plant will now be described with reference to the flow diagram. The operating time is divided into n periods.

At the beginning of the first operating period, container 25 is empty and container 24 is full. Note that container 24 needs to have a sufficient capacity for continuously supplying the heavy-water plant (not shown).

Advantageously, the container 24 is first filled during n operating periods of the total plant, during which time the heavy-water plant is out of operation.

During the first period, river water containing 146 ppmD/D+H is supplied at point 31 and the deuterium-enriched water at points a7 and a28 is supplied to the empty container 25 by opening the valve 30. During this time, the valve 29 in the supply line 27 to the container 24 is closed and enriched water for the heavy-water plant is taken from the container 24 through a line 32.

During the next (n−2) operating periods, the water required for the synthesis-gas plant is taken from the container 25, whereas the enriched water at points a7 and a28 is supplied as before to the container 25.

The container 25 must be constructed so that the deuterium-enriched waste water produced in the synthesis gas plant 1 and separated in the condenser 8 can be stored in layers, to prevent any mixing of the stored waste water during individual operating periods. This may advantageously be achieved by suitable dimensions, e.g. considerable length and small diameter, or by baffle-like structures or other means known in hot-water or cold storage technology.

During periods 1 to n−1 the throughput at point a29 is equal to the sum of the throughputs at points a7 and a28.

During points 1 to n−1 the throughput at point a29 is equal to the sum of the throughputs at points a7 and a28.

During the last period (n), the remaining water from the container 25 is used for hydrogen production in the plant 1 and the enriched water is supplied to the container 24 through the opened valve 29 (valve 30 is closed). At the end of the last period n, the container 25 is empty and the container 24 is full.

The throughput of enriched water at point a31 is constant during all periods and is determined by the relation:

$$\text{Throughput } (a31) = \text{throughput } (a30) \frac{\text{Duration of period } n}{\text{Total duration of all periods 1 to } n}$$

The following is a numerical example of a process as performed in a plant with 10 operating periods.

| Operating Period | Hours of Operation | Contents of Storage Container 25* (m³) | Deuterium Concentration at point 129, ppm D/D +H |
|---|---|---|---|
| I | 484 | 48 622 | 197 |
| II | 536 | 53 846 | 238 |
| III | 594 | 59 630 | 272 |
| IV | 658 | 66 037 | 298 |
| V | 728 | 73 132 | 321 |
| VI | 806 | 80 989 | 339 |
| VII | 893 | 89 691 | 353 |
| VIII | 990 | 99 327 | 365 |
| IX | 1 096 | 109 000 | 374 |
| X | 1 215 | 0 | 382 |
| TOTAL | 8 000 | | |

*At the end of the period in question

The assumed deuterium recovery yield of from the water fed into the heavy-water plant is 0.75.

The annual heavy-water production (8000 hours) is 38,795.77 kg/year.

For comparison purposes, the annual production for the process described in U.S. Pat. No. 4,426,370 is 17,034 kg/year and for Swiss Pat. No. 616 602 is 39,960 kg/h. The a factor obtained is $3.18 \times 10^{-4}$ Kg D₂O/kg H₂O whereas for the process of U.S. Pat. No. 4,426,370, the a factor is $2.42 \times 10^{-4}$ kg D₂O/kg H₂O and for Swiss Pat. No. 616 602 the a factor is $2.775 \times 10^{-4}$ kg D₂O/kg H₂O.

The total deuterium recovery yield is 17% in the present numerical example, 10% in U.S. Pat. No. 4,426,370 and 17% in Swiss Pat. No. 616 602.

The present numerical example shows that the method according to the invention, for 10 periods of operation, is better than the method according to U.S. Pat. No. 4,426,370, in that the a factor, the annual production and the total annual deuterium yield are greater. A method according to Swiss Pat. No. 616 602 is likewise inferior regarding the a factor, the deuterium recovery yield being the same and the deuterium production being somewhat lower.

Combined numerical examples will now be given for 20 cases, showing the output in dependence on the number of periods.

In all cases the total operating time is one year, i.e. 8000 hours.

In the first case, the total operating time was filled by a single operating period as in FIG. 1. In the second case, the operating time consists of two periods, the data for the second period being given. In the third case, the operating time consists of three periods, the date for the third period being given, etc. (See Table 1).

The number and duration of the operating periods are as follows:

TABLE 1

| Operating period | Duration of last operating period (in hours) | Throughput at inlet of D₂O plant | Deuterium Concentration at inlet of D₂O plant ppm | Heavy-water production, kg/year | $a \cdot 10^{-4}$ kg D₂O/kg H₂O |
|---|---|---|---|---|---|
| I | 8 000 | 100 458 | 197 | 131 957 | 1.642 |
| II | 4 204 | 52 794 | 328 | 83 890 | 1.986 |
| III | 2 943 | 26 954 | 272 | 66 975 | 2.265 |
| IV | 2 316 | 29 088 | 298 | 57 957 | 2.491 |
| V | 1 942 | 24 390 | 321 | 52 174 | 2.674 |
| VI | 1 695 | 21 294 | 339 | 48 061 | 2.822 |
| vii | 1 521 | 19 098 | 353 | 44 944 | 2.942 |
| VIII | 1 391 | 17 478 | 365 | 42 477 | 3.039 |
| IX | 1 292 | 16 218 | 374 | 40 468 | 3.117 |
| X | 1 214 | 15 246 | 382 | 38 796 | 3.181 |
| XI | 1 151 | 14 454 | 388 | 37 382 | 3.232 |
| XII | 1 057 | 13 284 | 397 | 35 129 | 3.308 |
| XIV | 1 021 | 12 824 | 400 | 34 222 | 3.335 |
| XV | 911 | 12 444 | 403 | 33 428 | 3.357 |
| XVI | 965 | 12 119 | 405 | 32 721 | 3.375 |
| XVII | 943 | 11 841 | 407 | 32 116 | 3.390 |
| XVIII | 924 | 11 600 | 408 | 31 572 | 3.402 |
| XIX | 907 | 11 391 | 409 | 31 090 | 3.412 |
| XX | 893 | 11 208 | 410 | 30 661 | 3.419 |

In all the aforementioned numerical examples, it is assumed that n periods total 1 year (8000 hours). In this case, the containers 24, 25 need relatively large volumes, particularly if the total duration of operation has a large number of periods.

On the other hand, it is economically advantageous to reduce the storage volume to a minimum and keep the individual periods as short as possible. The reason is that algae may grow in the containers 24, 25.

Admittedly, algae can be destroyed by chlorination, but chlorine must be completely eliminated by ion exchangers before water is supplied to the synthesis gas plant or the heavy-water plant. If water stays in the containers 24, 25 for only a short time, e.g. one day, the growth of algae can be avoided by slight chlorination or without any treatment. If only traces of algae are present, they can be reliably destroyed in the reformer furnace (operating temperature about 1000° C.) or in the heavy-water plant (operating temperature about 210° C.).

The shortest possible duration of an operating period is determined by the time water takes to travel through the synthesis gas plant. This time, in normal plants of this kind, is from a few hours to one day.

By means of the process, the average length of an operating period may advantageously be about 24 hours. This can be obtained by suitably controlling the supply of fresh water from the additional sources, more particularly at point a24. In a process performed in a plant according to FIG. 1 the enriched water from point a7 and a28 is mixed and collected in the containers 24 and 25. However, the deuterium concentrations at points a7 and a28 are not the same. Usually, the deuterium concentration at point a7 is greater than at point a28, as shown from the following numerical example.

Mixing two streams of water having different isotope concentrations counteracts the previous work of separation. If such mixing is avoided, it is likely that the output of the heavy-water plant will be increased, e.g. the a factor will rise.

Numerical example of the deuterium concentrations at points a7 and a28 corresponding to the numerical example in Table 1.

| Operating Period | Deuterium concentration at point a7, ppm | Deuterium concentration at point a28, ppm |
|---|---|---|
| I | 196 | 198 |
| II | 244 | 232 |
| III | 282 | 259 |
| IV | 314 | 281 |
| V | 339 | 299 |
| VI | 359 | 313 |
| VII | 376 | 325 |
| VIII | 389 | 335 |
| IX | 400 | 342 |
| X | 409 | 348 |
| XI | 416 | 353 |
| XII | 422 | 358 |
| XIII | 427 | 361 |
| XIV | 430 | 364 |
| XV | 434 | 366 |
| XVI | 436 | 367 |
| XVII | 438 | 369 |
| XVIII | 440 | 370 |
| XIX | 441 | 371 |
| XX | 442 | 372 |

Figure 2:
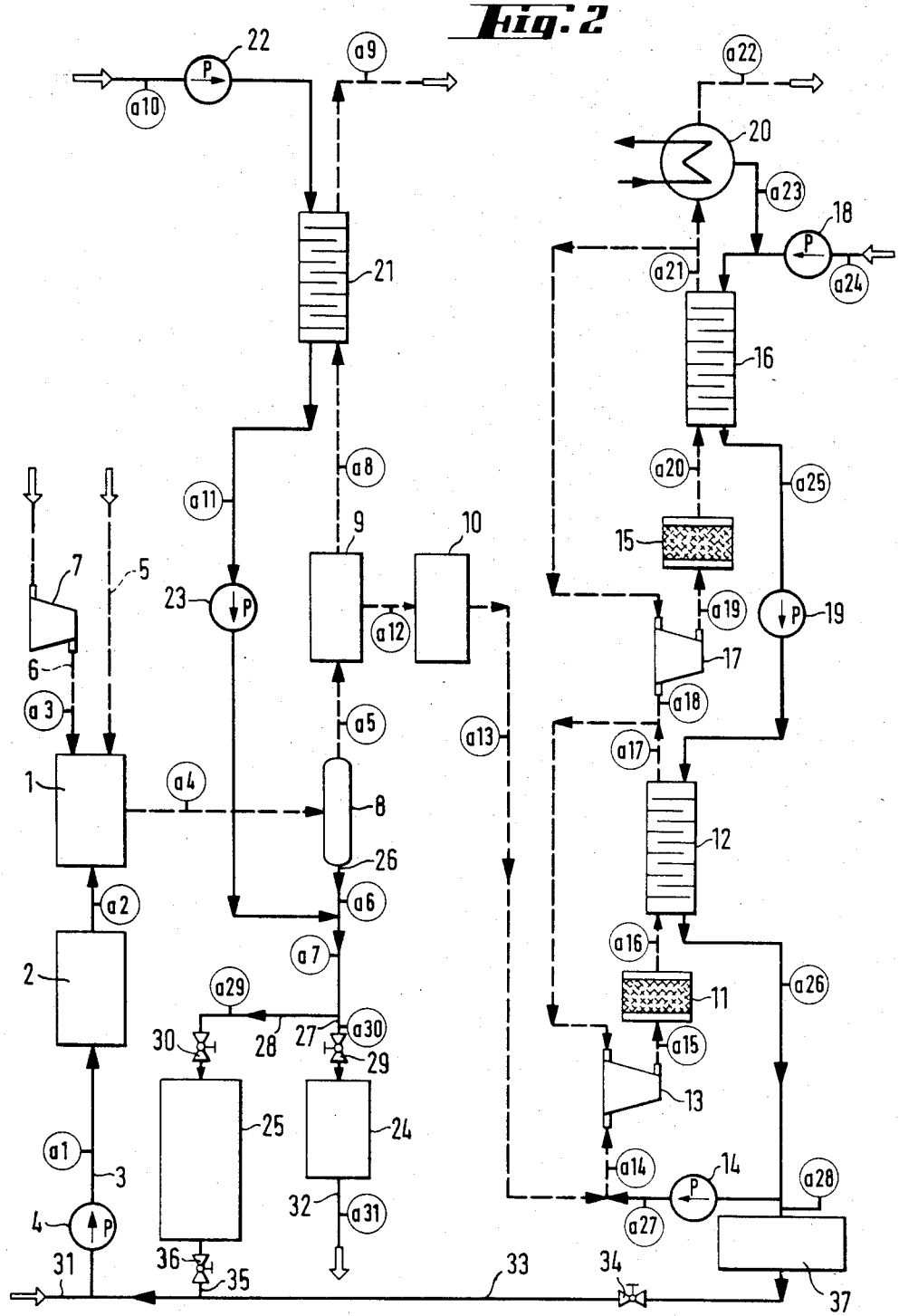
FIG. 2 illustrates a flow diagram of a modified plant in accordance with the invention.

FIG. 2 is a flow diagram of a plant according to an improved embodiment, taking account of the aforementioned considerations. Components corresponding to FIG. 1 are denoted by the same references.

In contrast to FIG. 1, a third container or store 37 is provided and has a withdrawal line 33 containing a shut-off means (valve) 34 and connected to the feed line of the synthesis gas plant 1. The line 33 is connected to a withdrawal line 35 of the container 25, and a shut-off means (valve) 36 is disposed in the line 35.

In FIG. 2, river water is supplied at place 31 only during the first period after initial starting-up, since at the beginning of this period all three containers are empty.

During the first period, enriched water is supplied to the containers 25 and 37, whereas at the initial starting-up the container 24 remains empty.

During each of the $n-2$ subsequent periods of initial starting-up (periods 2 to $n-1$) the synthesis gas plant 1 is supplied first with enriched water from container 25 and then with enriched water from container 37 or in reverse order, valve 34 being alternately closed and valve 36 opened, or valve 34 open and valve 36 being closed.

At the same time, in the same manner as in FIG. 1, enriched water from place a7 is collected in the container 25, whereas in contrast to FIG. 1, enriched water from place a28 is fed into the container 37.

During the last period, container 25 is emptied and containers 24 and 37 are filled.

During the next set of n periods, the contents of the container 37 is available as feed water for the hydrogen-producing plant 1 during period 1. This water is relatively rich in deuterium, so that relatively high deuterium concentrations are reached during the first period.

After a number of sets of n periods, a sort of equilibrium is established in the plant, i.e. the deuterium concentration increases only during a set of periods but does not increase from one period to the corresponding period in different, successive sets.

Equilibrium of this kind, however, can be obtained only if the content of the container 37 at the end of period n is exactly equal to the amount of water necessary for supplying the synthesis gas plant during the first period in the next set. This can be achieved by suitably regulating the water throughputs at points a24 and a28.

This state of affairs is illustrated by the following numerical example of a process which can be performed in an installation with nine operating periods. In order to obtain the aforementioned equilibrium, the throughputs a24 and a28 must be chosen as follows, in contrast to Swiss Pat. No. 616 602:

a24=2318 k mol/h (instead of 2385 k mol/h) and
a28=2452 k mol/h (instead of 2519 k mol/h).

| Operating Period | Hours of operation | Content of storage container, 25* (m³) | Content of storage container 37* (m³) | Deuterium concentration at the points: | |
|---|---|---|---|---|---|
| | | | | a7 ppm D/d + H | a28 ppm D/D + H |
| I | 603 | 33 235 | 26 613 | 415 | 356 |
| II | 660 | 36 377 | 29 129 | 423 | 361 |
| III | 723 | 39 849 | 31 909 | 429 | 366 |
| IV | 791 | 43 597 | 34 910 | 434 | 370 |
| V | 865 | 47 675 | 38 176 | 438 | 373 |
| VI | 947 | 52 195 | 41 795 | 442 | 375 |
| VII | 1 036 | 57 100 | 45 723 | 445 | 377 |
| VIII | 1 134 | 65 501 | 50 149 | 447 | 379 |
| IX | 1 241 | 68 399 | 54 771 | 449 | 380 |
| TOTAL | 8000 | | | | |

*At the end of the period in question. The assumed deuterium recovery yield from the water fed into the heavy-water plant is 0.75.

Annual heavy-water production (8000 h)   25578 kg/year

Compare:

U.S. Pat. No. 4,426,370   17034 kg/year
Swiss Patent 616 602   29960 kg/year
FIG. 1 (Two containers)   38796 kg/year a factor   $3.74 \times 10^{-4} \frac{\text{kg D}_2\text{O}}{\text{kg H}_2\text{O}}$ Compare:

-continued

| Operating Period | Hours of operation | Content of storage container, 25* (m³) | Content of storage container 37* (m³) | Deuterium concentration at the points: a7 ppm D/d + H | a28 ppm D/D + H |
|---|---|---|---|---|---|
| U.S. Pat. No. 4,426,370 | | | $2.42 \times 10^{-4} \frac{\text{kg D}_2\text{O}}{\text{kg H}_2\text{O}}$ | | |
| Swiss Patent 616 602 | | | $2.775 \times 10^{-4} \frac{\text{kg D}_2\text{O}}{\text{kg H}_2\text{O}}$ | | |
| FIG. 1 (Two containers) | | | $3.18 \times 10^{-4} \frac{\text{kg D}_2\text{O}}{\text{kg H}_2\text{O}}$ | | |

The overall deuterium recovery yield in the present numerical example is 23%, as compared with 10% in U.S. Pat. No. 4,426,370, 17% in Swiss Pat. No. 616 602 and 17% in the embodiment in FIG. 1, (two containers).

The a factor is 17.6% greater in the embodiment in FIG. 2 than in FIG. 1.

Figure 3:
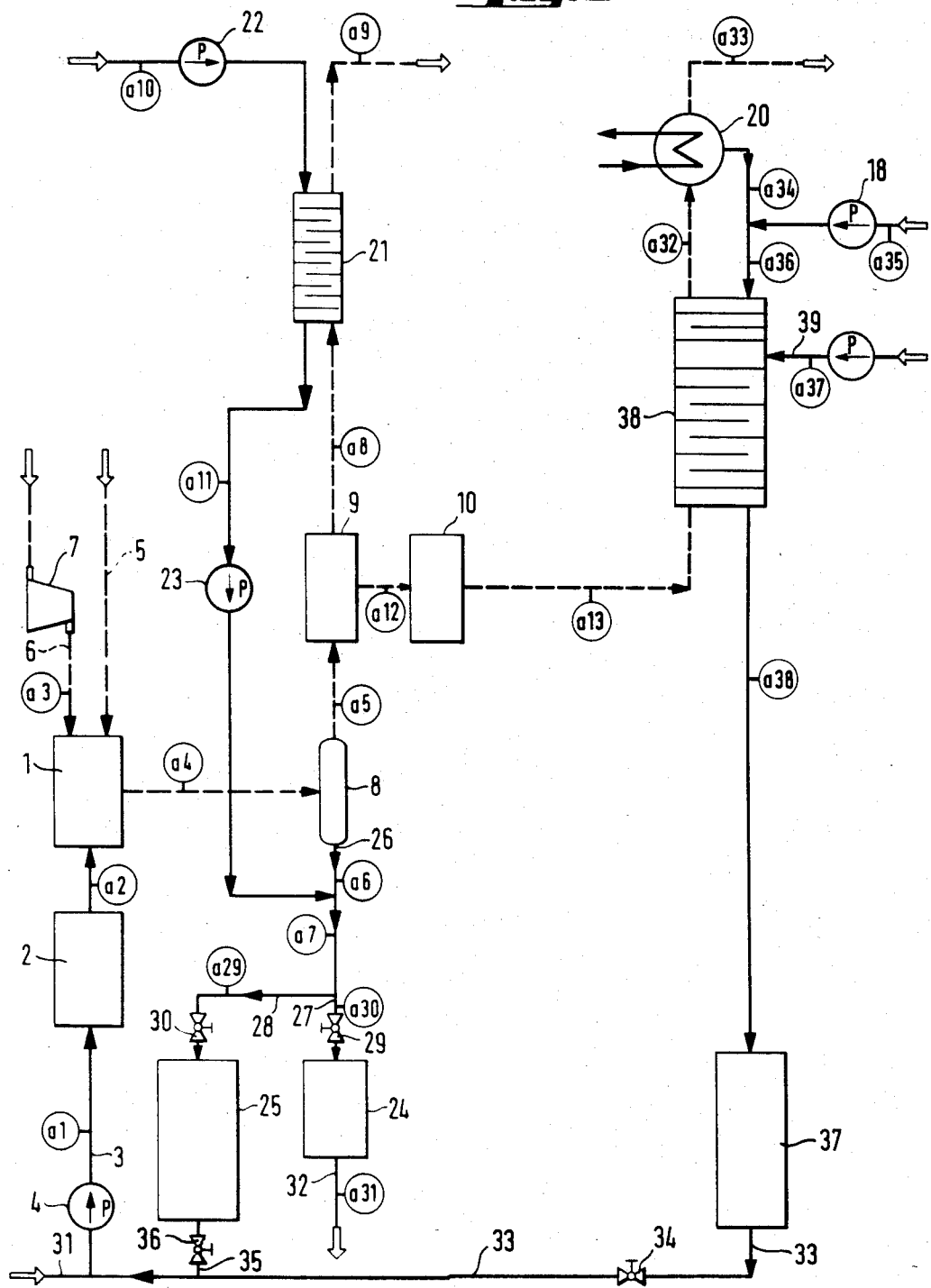
FIG. 3 illustrates a further modified plant in accordance with the invention.

FIG. 3 is a flow diagram of an embodiment of a plant which differs from FIGS. 1 and 2 with regard to the deuterium enrichment of the additional water. Components corresponding to FIG. 2 are given similar reference numbers.

In contrast to FIG. 1 or 2, the gas mixture from the condenser 8 or methanator 10 is supplied to an exchange column 38 and is brought into isotope exchange in counter-current with added fresh water having the natural deuterium concentration. As a result, the additional water becomes enriched in deuterium. Sodium hydroxide or potassium hydroxide catalyst is supplied to the exchange column 38 at place 39.

The top part of the column 38 acts as a scrubbing stage to prevent water drops entrained by the gas mixture and containing traces of catalysts from being directly introduced into the ammonia synthesis gas plant.

If required, a further water-treatment plant, consisting mainly of ion exchangers, can be disposed between the column 38 and container 37, in order to remove traces of catalyst from the additional water. In that case, the removed catalyst can be returned to the column 38 at place 39.

In other respects, the total plant operates in the same manner as in FIG. 2.

The following is a numerical example for a plant as in FIG. 3.

NUMERICAL EXAMPLE

Throughputs:

At places a1 to a13 the throughputs coincide with those in the numerical example on page 4 of Swiss Pat. No. 616 602.

a29:
    3062 kmol/h $H_2O$ during the first (n−1) periods
    0 kmol/h during the last period a30:
    3002 kmol/h $H_2O$ during the last period
    0 kmol/h during the first (n−1) periods a31: 475 kmol/h $H_2O$ a32:
    4069 kmol/h $H_2O$
    5837 kmol/h $H_2O$-steam
    At 200° C. and 30 bars a33:
    4069 kmol/h $H_2O$
    7 kmol/H $H_2O$ steam
    At 29° C. and 30 bars a34:
    5830 kmol/h $H_2O$
    At 29° C. and 30 bars a35:
    1502 kmol/h $H_2O$
    at 20° C.

a36: 7332 kmol/h $H_2O$ a37: 815 kmol/h $H_2O$ containing 10% NaOH in solution a38: 2451.924 kmol/h $H_2O$ containing 3.3% NaOH in solution.

8147 kmol/h $H_2O$ containing 1% NaOH in solution flows into the exchange column 38.

Numerical example for FIG. 3 with 9 operating periods and three storage containers

| Operating Period | Hours of operation | Contents of storage container 25* (m³) | Contents of storage container 37* (m³) | Deuterium concentration at the points: a7 ppm D/D + H | a38 ppm/D/D + H |
|---|---|---|---|---|---|
| I | 604 | 33 290 | 26 657 | 363 | 291 |
| II | 661 | 36 432 | 29 173 | 369 | 296 |
| III | 723 | 29 849 | 31 909 | 374 | 302 |
| IV | 791 | 43 597 | 34 910 | 379 | 306 |
| V | 866 | 47 730 | 38 220 | 384 | 311 |
| VI | 948 | 52 250 | 41 840 | 388 | 315 |
| VII | 1 037 | 57 155 | 45 768 | 392 | 319 |
| VIII | 1 135 | 62 557 | 50 093 | 395 | 322 |
| IX | 1 235 | 68 068 | 54 506 | 398 | 325 |
| TOTAL | 8000 | | | | |

*At end of period in question The assumed deuterium recovery yield from the water fed into the heavy-water plant is 0.75.

Annual heavy-water production (8000 h)     22728 kg/year

Compare:

| | |
|---|---|
| U.S. Pat. No. 4,426,370 | 17034 kg/year |
| Swiss Patent 616 602 | 39960 kg/year |
| FIG. 1 (two containers) | 38796 kg/year |
| FIG. 2 (three containers) | 25578 kg/year |
| a factor | $3.324 \times 10^{-4} \frac{\text{kg D}_2\text{O}}{\text{kg H}_2\text{O}}$ |

-continued

Numerical example for FIG. 3 with 9 operating periods and three storage containers

| Operating Period | Hours of operation | Contents of storage container 25* (m³) | Contents of storage container 37* (m³) | Deuterium concentration at the points: | |
|---|---|---|---|---|---|
| | | | | a7 ppm D/D + H | a38 ppm/D/D + H |

Compare:

U.S. Pat. No. 4,426,370  $2.42 \times 10^{-4} \frac{\text{kg } D_2O}{\text{kg } H_2O}$ Swiss Patent 616 602  $2.775 \times 10^{-4} \frac{\text{kg } D_2O}{\text{kg } H_2O}$ FIG. 1 (two containers)  $3.18 \times 10^{-4} \frac{\text{kg } D_2O}{\text{kg } H_2O}$ FIG. 2 (three containers)  $3.74 \times 10^{-4} \frac{\text{kg } D_2O}{\text{kg } H_2O}$ In the present numerical example, the total deuterium recovery yield is 20% as compared with 10% in U.S. Pat. No. 4,426,370, 17% in Swiss Pat. No. 616 602, 17% in the embodiment in FIG. 1 (two containers) and 23% in the embodiment in FIG. 2 (three containers).

This shows that the results of the method in FIG. 3 are less favorable than in FIG. 2. The apparatus, however, is much less expensive, since only one exchange column is required instead of two containers with a solid-bed catalyst, two exchange columns and two compressors.

What is claimed is:

1. A method of obtaining deuterium-enriched water, said method comprising the steps of
   supplying a synthesis gas plant over (n) successive operating periods with at least one hydrocarbon and an excess of water or steam to obtain a mixture of hydrogen, steam, carbon dioxide and residual components;
   separating said mixture into a deuterium-enriched condensate consisting of waste water and a gas fraction containing hydrogen, steam, and residual components;
   storing said condensate in a container in layers corresponding to the deuterium concentration;
   supplying fresh water in excess to the synthesis gas plant during an initial operating period of said (n) operating periods;
   supplying waste water from the poorest deuterium-containing layer in the container to the synthesis gas plant during subsequent operating periods of said (n) operating periods except for the last operating period;
   supplying waste water from the container to a second container during said last operating period for subsequent supply to a plant for obtaining heavy water;
   delivering said gas fraction to at least one exchange stage;
   bringing the hydrogen of said gas fraction into isotope exchange with additional water having a natural deuterium concentration in said exchange stage to deplete said gas fraction of deuterium while enriching the additional water with deuterium; and
   storing the deuterium enriched water from said exchange stage for supply to the synthesis gas plant during (n−1) operating periods.

2. A method as set forth in claim 1 wherein the hydrogen of said gas fraction is first brought into isotope exchange with steam to enrich the steam with deuterium while depleting the hydrogen of deuterium and thereafter the enriched steam is brought into isotope exchange in countercurrent with the additional water to enrich the additional water and deuterium while depleting the steam of deuterium.

3. A method as set forth in claim 1 wherein the entire gas fraction is brought into isotope exchange with the additional water in countercurrent;
   and which further comprises the step of dissolving one member selected from the group consisting of sodium hydroxide and potassium hydroxide in the additional water whereby the gas fraction is depleted of deuterium while the additional water is enriched with deuterium.

4. A method as set forth in claim 1 wherein the deuterium enriched water from said exchange stage is mixed with the waste water in the container for supply to the synthesis gas plant.

5. A method as set forth in claim 1 wherein the deuterium enriched water from said exchange stage is stored in a third container and wherein the waste water in the first container and the water in the third container are successively supplied to the synthesis gas plant during each of the successive (n−1) operating periods.

6. A plant for producing deuterium-enriched water comprising
   a synthesis gas plant for producing a mixture of hydrogen, steam, carbon dioxide and residual components from water and at least one hydrocarbon;
   a condensor for separating the mixture from said synthesis gas plant into a deuterium-enriched condensate consisting of waste water and a gas fraction containing hydrogen, steam and residual components;
   a first container connected with said condenser to selectively receive successive charges of the condensate in layers from said separator, said container being connected at a lower end with said synthesis gas plant to selectively supply waste water to said synthesis gas plant;
   means for selectively supplying fresh water to said synthesis gas plant during an initial operating period;
   a second container connected with said condenser to selectively receive condensate from said separator in a last operating stage for subsequent supply to a plant for obtaining heavy water;
   at least one exchange stage connected with said condenser for receiving and placing the gas fraction from said condenser in isotope exchange with additional water having a natural deuterium concentration to deplete said gas fraction of deuterium while enriching the additional water with deuterium; and means for storing the enriched additional water from said exchange stage for supply to said synthesis gas plant.

7. A plant as set forth in claim 6 wherein said means for storing is a third container connected between said exchange stage and said synthesis gas plant.

8. A plant as set forth in claim 6 which further comprises a condenser connected to said exchange stage to receive a flow of hydrogen, steam and nitrogen from said exchange stage, said condensor having an outlet for supplying the received hydrogen and nitrogen to an ammonia synthesis plant.

* * * * *

UNITED STATES PATENT AND TRADEMARK OFFICE
CERTIFICATE OF CORRECTION

PATENT NO. : 4,504,460

DATED : March 12, 1985

INVENTOR(S) : Charles Mandrin

It is certified that error appears in the above-identified patent and that said Letters Patent is hereby corrected as shown below:

Column 4, line 52 change "poned" to --ponents--

Column 4, line 56 change "componed" to --components--

Column 7, line 42 change "109000" to --109999--

Column 8, Table 1, Period III, third sub-column change "26954" to --36,954--

Column 8, Table 1, between Periods XI and XII insert --XII 1099 13806 393 36173 3.274--

Column 8, Table 1, change Period "XII" to --XIII--

Column 10, Table 1, Period VIII, third sub-column change "65501" to --62501--

Column 10, Table 1, Period VII, fourth sub-column change "50149" to --50049--

UNITED STATES PATENT AND TRADEMARK OFFICE
CERTIFICATE OF CORRECTION

PATENT NO. : 4,504,460

DATED : March 12, 1985

INVENTOR(S) : Charles Mandrin

Page 2 of 2

It is certified that error appears in the above-identified patent and that said Letters Patent is hereby corrected as shown below:

```
Column 12, Table 1, Period III, second sub-column
    change "29849" to --39849--
```

Signed and Sealed this

Third Day of September 1985

[SEAL]

*Attest:*

DONALD J. QUIGG

*Attesting Officer*  Acting Commissioner of Patents and Trademarks - Designate